Figure 1:
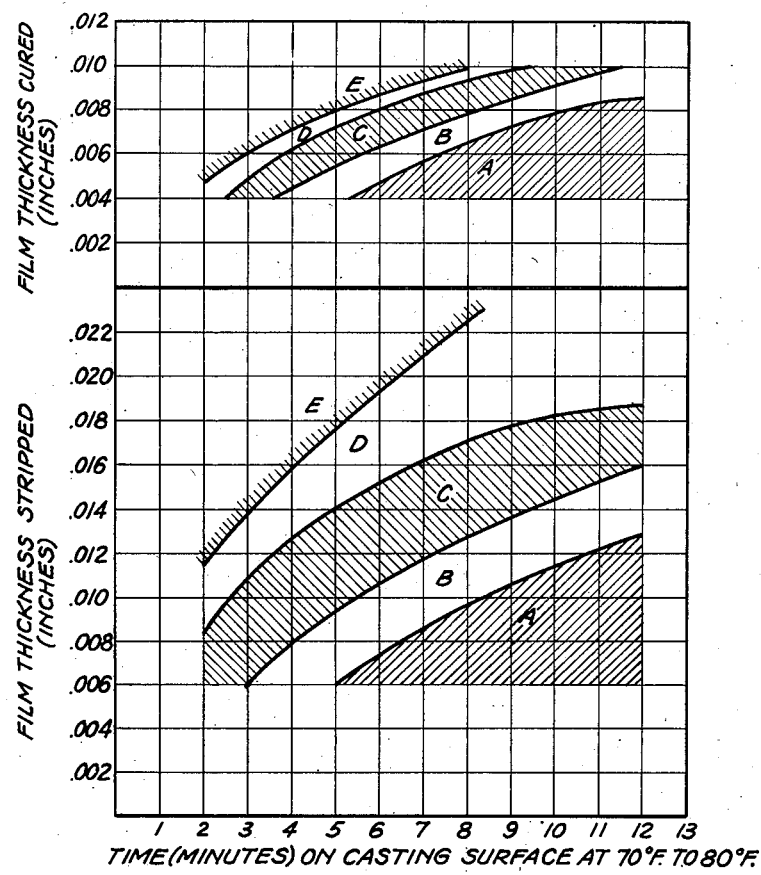

CHARLES R. FORDYCE
BRUCE E. GRAMKEE
INVENTORS

Patented Aug. 19, 1952

2,607,704

UNITED STATES PATENT OFFICE 2,607,704

CELLULOSE ACETATE SOLUTION AND A FILM FORMED THEREFROM

Charles R. Fordyce and Bruce E. Gramkee, Rochester, N. Y., assignors to Eastman Kodak Company, Rochester, N. Y., a corporation of New Jersey Application May 24, 1949, Serial No. 95,014

7 Claims. (Cl. 106—189)

This invention relates to cellulose acetate solutions and the film base therefrom. More particularly, this invention concerns improvements in cellulose acetate solutions which permit obtaining from said solutions, at a higher coating speed, a photographic film base having overall properties at least equivalent or superior to the film base in present large scale commercial use and having, in addition, the valuable properties of being relatively noninflammable and dimensionally stable.

This application is a continuation-in-part of our applications Serial Nos. 707,807 and 707,808, now Patents Nos. 2,492,977 and 2,492,978. Inasmuch as our companion patents just referred to set forth in considerable detail background information on cellulose ester solutions and film forming, only brief reference will be made herein to the problems facing the industry prior to the inventions of our patents aforementioned and the improvement invention described in the instant specification. It appears sufficient to point out that prior to our inventions and, as established in the art, cellulose nitrate has been regarded as a standard material for the manufacture of commercial film base. Cellulose nitrate possesses the advantages, for example, for use in commercial motion-picture film base, of high tensile strength, flexibility, moisture resistance and rigidity. Such properties are valuable for commercial motion-picture film since, for example, high tensile strength insures good wearing characteristics on projection and, as is well known, motion-picture film, of course, may be projected many hundreds of times. Flexibility is essential to proper behavior on handling. Good moisture resistance and rigidity are necessary properties for preventing dimensional change, tendency to curl, and the like.

While, as just indicated, cellulose nitrate has in the past been the standard material, as is also well known, cellulose nitrate film base presents the problem and disadvantage from the standpoint of high inflammability. Therefore, it has long been recognized that it would be desirable to have a material for motion-picture film base and similar purposes which does not have the undesirable inflammability characteristics of cellulose nitrate but does have the desirable characteristics. Up to the time of the inventions described in our patents aforementioned and in the instant specification, as far as we are aware, no product had been developed which was successful in meeting the physical requirements briefly outline above and which was relatively noninflammable as compared with cellulose nitrate film base.

There is, of course, safety film manufactured for home use and other amateur purposes which has low inflammability and meets the conditions for home and amateur use for which the film is designed. Such film, which will be referred to herein as amateur film, does not possess the properties which would render it capable of use under drastic conditions which are encountered in the commercial motion picture field. That is, the presently available amateur safety film, when compared with commercial nitrate film, does not possess equivalent tensile strength, susceptibility to moisture, and like properties. In further detail, for example, whereas the range of swell and shrink for commercial nitrate film might be about .5% to .8%, presently available partially hydrolyzed organic ester (safety) film may show swell and shrink characteristics of from 1.0% to 1.75%.

It is, therefore, apparent that the production of a cellulose ester solution which will give a film that is relatively noninflammable but which film at the same time possesses properties of strength, flexibility, moisture resistance, and rigidity that are at least of the order of the properties possessed by presently available commercial cellulose nitrate film is a highly desirable result.

We have found in accordance with the invention described in detail herein, that a cellulose acetate solution may be prepared, provided a certain type of cellulose ester is used and there is incorporated in this solution contents of certain ingredients which, with proper casting technique, permit the production, at high coating speeds, of a commercial film base that not only possesses the desired and comparable properties to presently available cellulose nitrate film base, but represents an improvement over presently available film base in its relative noninflammability, speed of manufacture, and in other features, as will be apparent from a consideration of the description which follows.

This invention has as one object to provide cellulose acetate solutions which are adapted for the casting of a relatively noninflammable film base having such physical properties as to render the film base acceptable for use in the commercial motion-picture industry. Another object is to provide from high acetyl cellulose acetates compositions adapted for the casting at high speeds of commercial motion-picture film having high tensile strength, good flexibility, moisture resistance, rigidity, noninflammability and good stability. A still further object is to provide a cellulose acetate solution capable of forming relatively noninflammable commercial film base at higher coating speeds in that a shortened time period is required from the instant the solution is deposited on the film forming surface to the time of stripping. Still another and particularly important object is to provide a solution that not only may be cast at higher speeds but which is susceptible of film forming over a wider range of operation. Another object is to provide a new uncured film base. Still another object is to provide a method of manufacturing noninflammable film base of the class described. Another object is to provide a new finished acetate-type film characterized by its dimensional stability and other improved properties. Other objects will appear hereinafter.

Figure 2:
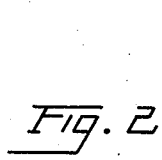

An understanding of the broader features of our invention will be had from the general description which immediately follows. Thereafter will be set forth specific examples of our invention. In these descriptions reference will be made to the attached drawing forming a part of the present application in which Figure 1 is a chart or graph showing a certain relationship between film thickness and casting speed. Figure 2 is a chart showing relationship with respect to the plasticizer content of the novel compositions described in the present application.

From the preceding discussions, it is apparent that cellulose nitrate (an inorganic acid ester of cellulose) comprises the material heretofore used commercially for film base and similar purposes but is disadvantageous because of inflammability. The safety film compositions proposed for amateur purposes are comprised of organic esters of cellulose, but are of the partially hydrolyzed acetone-soluble type.

In contrast thereto, the cellulose ester component used in our solutions of the present invention comprise a selected high acetyl type of organic esters of cellulose which at sometimes hereinafter may be referred to in a general way as the triester or triacetate type. Methods for the manufacture of the high acetyl and triester type of cellulose acetate are already known in the art, hence description of this aspect is unnecessary, and it will be assumed for the purposes of describing the instant invention that a supply of the high acetyl type of cellulose acetate is on hand.

We have found that the addition of cyclohexane in an amount within the range of approximately 5% to 10% to a solution of high acetyl cellulose acetate of 42.5% to 44.0% acetyl content in methylene chloride-methyl alcohol will increase the coating speed in proportion to the amount added. As will be apparent as the description proceeds the methylene chloride component may be present in an amount of, for example, from 65 to 90% and the methyl alcohol component in an amount in the range of 25 to 5%.

We have also found that for quality of product, the composition preferably should contain from 10 to 30 parts of plasticizer for 100 parts of this type cellulose acetate. Cyclohexane appears to be a specific agent in this casting solvent combination, and in addition to improved casting speeds, it results in certain improved physical characteristics of the film support. Its best effect seems to occur when present in amounts greater than 4% of the total solvent combination, but preferably is not incorporated in quantities greater than 10% of the solvent mixture because mixtures containing more than that amount will not too easily dissolve very high acetyl cellulose acetate. As will be explained, we prefer a selected acetyl within the range of 42.5% to 44.0%.

In further detail, increasing amounts of cyclohexane have given increased rates of film casting, as represented by the following results:

| Amount of Cyclohexane | Time on Casting Surface Minutes | Film Thickness when— | | Stripping Thickness in Percent greater than Cured Thickness |
|---|---|---|---|---|
| | | Stripped | Cured | |
| Percent | | Inch | Inch | |
| 5 | 3.9 to 4.0 | .010 | .0058 | 72 |
| 8 | 3.4 to 3.5 | .011¼ | .0055 | 105 |
| 10 | 2.8 to 3.2 | .012 | .0055 | 113 |

In our previous applications, Serial Nos. 707,807 and 707,808, now Patents 2,492,977 and 2,492,978, high speeds of casting were obtained by operating under conditions outlined as area D of Figure 1 in those patents. This chart, reproduced as Figure 1 in the attached drawing, includes an area C of slightly slower casting operation speeds, which could not be used readily with the former solvent compositions because of unsatisfactory stripping behavior. By use of cyclohexane in the solvent compositions, however, we have now found that high speed casting operations can be carried out anywhere within the areas B, C, or D and thus the usefulness in manufacturing has been greatly increased.

This is a distinct improvement not only because of the speed advantage, but it also eliminates the area C. The film, when stripped, is usually greater than 100% thicker than the final cured thickness. These figures were obtained using an 80° F. casting surface.

The aspect under consideration can be improved if the casting surface temperature is lowered. A solution in accordance with the present invention for casting runs was made in the following way:

A uniform solution of 100 parts of cellulose acetate of 43.4% acetyl content in 384 parts of methylene chloride and 52 parts of methyl alcohol was prepared at room temperature. There was then added with stirring a mixture of 42 parts of cyclohexane and 42 parts of methylene chloride. After thorough mixing there was then added 15 parts of triphenyl phosphate as plasticizer. The resulting solution was supplied to the hopper of a film casting machine, such as a machine similar to that shown in Fordyce et al. 2,319,052, in the usual manner. The following results were obtained by controlling the casting surface at 80° F., 70° F., and 60° F., respectively.

| Casting Surface Temperature | Time on Casting Surface Minutes | Film Thickness when— | | Stripping Thickness in Percent greater than cured Thickness |
|---|---|---|---|---|
| | | Stripped | Cured | |
| °F | | Inch | Inch | Percent |
| 80 | 3.4 | .0118 | .0056 | 110 |
| 70 | 3.2 | .013 | .0058 | 124 |
| 60 | 3.0 | .014 | .0058 | 140 |

The physical properties of support from the cyclohexane formulae of the instant invention are in general similar to those obtained from casting compositions containing ethylene or propylene chlorides of our Patents 2,492,977 and 2,492,978. This includes tensile strength, flexibility, tear strength, and Young's modulus.

There is, however, a particular improvement in swell and shrink amplitude by use of from about 8% to 10% of the total solvent as cyclohexane in the formula. A summary of this property is as follows:

| Amount of Cyclohexane | Range of Swell and Shrink Amplitude (Percent) | |
|---|---|---|
| | Length | Width |
| Percent | | |
| 8 | .57–.65 | .73–.85 |
| 10 | .56–.65 | .72–.87 |

It will be noted that for each concentration of cyclohexane, there is a range of swell and shrink amplitude in each direction. This is because of a variation due to the temperature of casting surface as just pointed out, the value being lower with lower casting surface temperature.

As an example, the following table illustrates swell and shrink amplitudes of products obtained from a casting composition containing 8% cyclohexane:

| Casting Surface Temperature | Swell and Shrink (Percent) | |
|---|---|---|
| | Length | Width |
| °F. | | |
| 80 | .61 | .84 |
| 70 | .60 | .80 |
| 60 | .56 | .78 |

In this description, it should be noted that the swell and shrink amplitude of film support made by cyclohexane formula of the present invention is definitely lower than that of support made from solvent mixtures containing propylene or ethylene dichlorides of our Patents 2,492,977 and 2,492,978 aforementioned.

While we do not wish to be bound by any theory of operation, the following general explanation may aid in the understanding of our invention. We believe that the desirably low swell and shrink amplitude, high coating speed, and physical properties may be due to the addition of the cyclohexane to the solvent formula, which causes a coagulation of the cellulose triacetate type ester in the solvent mixture after the evaporation of part of the solvent. This enables the stripping of the film 70% to 140% thicker than the cured film thickness, after which it can be rapidly cured from both surfaces.

A further understanding of our invention will be had from a consideration of the several examples which follow: In these examples the solutions were prepared as described above, film cast and tested to give the described data.

*Example I*

This example illustrates a composition containing solvents in the ratio of 82% methylene chloride, 8% cyclohexane, 10% methyl alcohol.

| | |
|---|---|
| Cellulose acetate (high acetyl) _____parts__ | 100 |
| Methylene chloride _____do___ | 435 |
| Cyclohexane _____do___ | 42 |
| Methyl alcohol _____do___ | 53 |
| Triphenyl phosphate _____do___ | 15 |
| Casting surface temperature _____°F__ | 80 |
| Time on casting surface _____minutes__ | 3.4 |
| Thickness when stripped _____do___ | .0115 |
| Thickness when cured _____do___ | .0055 |
| Ratio of thickness _____percent__ | 105 |

| | Length | Width |
|---|---|---|
| Swell and shrink, percent | .57 | .76 |
| Tensile strength, lbs./sq. in | 14,100 | 12,900 |
| Folds | 11 | 9 |
| Tear, grams | 50 | 56 |

*Example II*

This example illustrates a composition containing solvents in the ratio of 82% methylene chloride, 8% cyclohexane, 10% methyl alcohol.

| | |
|---|---|
| Cellulose acetate (high acetyl) _____parts__ | 100 |
| Methylene chloride _____do___ | 426 |
| Cyclohexane _____do___ | 42 |
| Methyl alcohol _____do___ | 52 |
| Triphenyl phosphate _____do___ | 15 |
| Casting surface temperature _____°F__ | 70 |
| Time on casting surface _____minutes__ | 3.2 |
| Thickness when stripped _____do___ | .0130 |
| Thickness when cured _____do___ | .0058 |
| Ratio of thickness _____percent__ | 124 |

| | Length | Width |
|---|---|---|
| Swell and shrink, percent | .60 | .80 |
| Tensile strength, lbs./sq. in | 13,300 | 11,250 |
| Folds | 12 | 12 |
| Tear, grams | 59 | 69 |

*Example III*

This example illustrates a composition containing solvents in the ratio of 82% methylene chloride, 8% cyclohexane, 10% methyl alcohol.

| | |
|---|---|
| Cellulose acetate (high acetyl) _____parts__ | 100 |
| Methylene chloride _____do___ | 426 |
| Cyclohexane _____do___ | 42 |
| Methyl alcohol _____do___ | 52 |
| Triphenyl phosphate _____do___ | 15 |
| Casting surface temperature _____°F__ | 60 |
| Time on casting surface _____minutes__ | 3.0 |
| Thickness when stripped _____do___ | .0140 |
| Thickness when cured _____do___ | .0058 |
| Ratio of thickness _____percent__ | 140 |

| | Length | Width |
|---|---|---|
| Swell and shrink, percent | .56 | .78 |
| Tensile strength, lbs./sq. in | 13,800 | 12,750 |
| Folds | 12 | 17 |
| Tear, grams | 60 | 65 |

*Example IV*

This example illustrates a composition containing solvents in the ratio of 87% methylene chloride, 8% cyclohexane, 5% methyl alcohol.

| | |
|---|---|
| Cellulose acetate (high acetyl) _____parts__ | 100 |
| Methylene chloride_____do____ | 496 |
| Cyclohexane _____do____ | 46 |
| Methyl alcohol _____do____ | 28 |
| Triphenyl phosphate _____do____ | 15 |
| Casting surface temperature_____° F__ | 75 |
| Time on casting surface_____minutes__ | 3.2 |
| Thickness when stripped_____do____ | .0122 |
| Thickness when cured_____do____ | .0057 |
| Ratio of thickness_____percent__ | 114 |

| | Length | Width |
|---|---|---|
| Swell and shrink, percent | .65 | .76 |
| Tensile strength, lbs./sq. in | 12,900 | 12,000 |
| Folds | 12 | 12 |
| Tear, grams | 45 | 52 |

Example V

This example illustrates a composition containing solvents in the ratio of 77% methylene chloride, 8% cyclohexane, 15% methyl alcohol.

| | |
|---|---|
| Cellulose acetate (high acetyl)_____parts__ | 100 |
| Methylene chloride_____do____ | 413 |
| Cyclohexane _____do____ | 43 |
| Methyl alcohol_____do____ | 80 |
| Triphenyl phosphate_____do____ | 15 |
| Casting surface temperature_____°F__ | 75 |
| Time on casting surface_____minutes__ | 3.6 |
| Thickness when stripped_____do____ | .0117 |
| Thickness when cured_____do____ | .0054 |
| Ratio of thickness_____percent__ | 117 |

| | Length | Width |
|---|---|---|
| Swell and shrink, percent | .62 | .78 |
| Tensile strength, lbs./sq. in. | 14,100 | 11,700 |
| Folds | 11 | 14 |
| Tear, grams | 44 | 57 |

Example VI

This example illustrates a composition containing solvents in the ratio of 82% methylene chloride, 8% cyclohexane, 10% ethyl alcohol.

| | |
|---|---|
| Cellulose acetate (high acetyl)_____parts__ | 100 |
| Methylene chloride_____do____ | 439 |
| Cyclohexane _____do____ | 43 |
| Ethyl alcohol_____do____ | 54 |
| Triphenyl phosphate_____do____ | 15 |
| Casting surface temperature_____°F__ | 75 |
| Time on casting surface_____minutes__ | 3.2 |
| Thickness when stripped_____do____ | .0130 |
| Thickness when cured_____do____ | .0056 |
| Ratio of thickness_____percent__ | 132 |

| | Length | Width |
|---|---|---|
| Swell and shrink, percent | .54 | .70 |
| Tensile strength, lbs./sq. in. | 14,800 | 13,000 |
| Folds | 12 | 13 |
| Tear, grams | 38 | 43 |

In the above examples it will be understood that the cellulose acetate has been used to refer to an ester having a selected high acetyl range, such as containing acetyl from 42.5% to 44.0% as already discussed in the first part of the specification. Where casting surface has been referred to this is intended to refer to any usual casting surface such as are used in processes of film forming, such as wheels, continuous bands or other similar film forming apparatus. The other items appearing in the examples will be apparent to those skilled in the art, particularly in the light of the general description in the first part of the instant specification and our Patents 2,492,977 and 2,492,978.

In the first part of this specification, we pointed out that the retention of cyclohexane becomes less as the plasticizer content of the coating composition is increased. The amount of plasticizer of our composition has been varied from 5% to 25% in runs designed for film support. In addition, such formulas have also been used to coat an acetate sheeting support (wrapping sheeting); for this latter product we have used 30% of plasticizer.

In the case of the film runs, triphenyl phosphate has been used. The graph of Fig. 2 shows the advantage of increased amounts of plasticizer. The products represented in this Fig. 2 curve concerning residual solvent content were prepared by use of about maximum curing temperatures which appear practical for commercial use. This is because higher temperatures result in excessive loss of plasticizer from the composition during the curing operation. The curve thus represents approximately the lowest practical residual solvent content for each plasticizer content.

It is desirable to maintain a comparatively low level of residual solvent in photographic film support, because if allowed to remain in the film, it may slowly volatilize during aging, causing a corresponding dimensional shrinkage of the product. Investigation has shown that the residual solvent preferably should not be greater than 6% to 8% for best shrinkage quality. It is, therefore, a feature of the preferred embodiment of our composition that it contain a plasticizer or mixture of plasticizers in amount of at least 10 parts for 100 parts of cellulose acetate.

On the other hand, however, excessive amounts of plasticizer also are somewhat unsatisfactory because of loss of strength in the film support. For this reason the amount of plasticizer in our preferred embodiments is not greater than about 30 parts for 100 parts of cellulose acetate.

In the range from 5 to 20% plasticizer it will be observed that the slope of the curve of Fig. 2 is quite linear showing almost an even exchange of solvent for plasticizer.

The following table summarizes the physical properties of a cellulose acetate (high acetyl) dissolved in a solvent composition of 82% methylene chloride, 8% cyclohexane, 10% methyl alcohol with varying plasticizer content:

| | Parts |
|---|---|
| Cellulose acetate (high acetyl) | 100 |
| Methylene chloride | 426 |
| Cyclohexane | 42 |
| Methyl alcohol | 52 |

(Parts per 100 parts of acetate)

| Plasticizer Content, Percent | 5 | 10 | 15 | 20 | 25 |
|---|---|---|---|---|---|
| Time on casting surface, minutes | 3.4 | 3.4 | 3.4 | 3.6 | 3.4 |
| Thickness when stripped | .0110 | .0110 | .0115 | .0118 | .0118 |
| Thickness when cured | .0057 | .0058 | .0057 | .0056 | .0057 |
| Swell and shrink, percent: | | | | | |
| Length | .70 | .58 | .67 | .60 | .56 |
| Width | .82 | .73 | .84 | .73 | .67 |
| Tensile Strength, lbs./sq. in.: | | | | | |
| Length | 12,400 | 12,700 | 13,900 | 13,500 | 13,700 |
| Width | 10,000 | 10,800 | 12,000 | 12,700 | 12,500 |
| Folds: | | | | | |
| Length | 8 | 10 | 10 | 11 | 11 |
| Width | 9 | 13 | 11 | 12 | 9 |
| Tear, grams: | | | | | |
| Length | 52 | 53 | 54 | 45 | 43 |
| Width | 56 | 61 | 63 | 48 | 43 |

It will be noted that the tensile strength of the products containing 5% and 10% plasticizer are inferior to those of higher plasticizer content. This is because of the comparatively larger amount of residual solvent remaining in those films. Higher plasticizer ratios afford more efficient curing of the films, with consequently higher strengths.

In the above description triphenyl phosphate has been referred to as the plasticizer. This type of plasticizer is preferred because of its non-inflammable nature. However, other plasticizers suitable for film use such as tricresyl phosphate, diethyl phthalate, dibutyl phthalate and tripropionin may be used either alone in place of or in conjunction with the triphenyl phosphate.

The graphic representation of Fig. 1 has already been briefly discussed above for showing that in accordance with the present invention high stripping speeds may be accomplished not only in areas B and D but also in area C. This, of course, permits a wider range of operation. In our companion patents the significance of the other reference characters, A, E, etc., are set forth. However, for the purpose of completeness of the present application, the additional description of these items is set forth.

Referring to Fig. 1, area A represents a range of film forming operations in which the resulting film will be comparatively well cured at the time of stripping. This area A, however, constitutes such slow film forming operations that it is not comparable to the high speed of operation in area D accomplished by the present invention.

Area B, on the other hand, represents a range of improved operation which is faster than operations under A; area B, for example, representing operations in accordance with our companion patents already referred to above.

The area C represents a range of operations which, while faster than those falling under area B, could not be used readily with casting compositions described in our Patents 2,492,977 and 2,492,978 because they resulted in a residual deposit on the casting surface. In the present application, however, the use of cyclohexane has eliminated this condition and permits entirely satisfactory casting operation anywhere within the areas B, C, or D. It may be seen from the foregoing that area C represents an operative area and that B and D also comprise useful areas. Accordingly, it is apparent that an extension of the boundaries of area C may also be considered as constituting the boundaries of areas B and D.

Line E represents an approximate boundary with respect to which the stripping character of the film tends to become somewhat unsatisfactory as the conditions of operation are brought outside of area D and into an area beyond line E.

It is believed that from the foregoing it will be seen that we have provided improved cellulose acetate solutions for film forming over extended areas of operation, methods of making said solutions and converting the solutions to partially and finally cured film base of commercial value. With respect to this latter item, it is believed that we have produced, as a new product, dimensionally stable acetate film capable of being easily spliced, which contains as an essential component acetate with selected high acetyl. By employing a selected high acetyl, preferably within the range of from 42.5% to 44.0%, ready solution is obtained. On the other hand, if a triacetate say of 44.8% acetyl is employed there may be some difficulty from the commercial standpoint of getting this into solution satisfactorily and rapidly. In addition, by employing the selected high acetyl range we have set forth a finished cured film which may be more easily spliced as compared with a completely esterified (triacetate) film is obtained.

With further reference to dimensional stability our film is dimensionally stable within 0.6% as compared for example with average amateur film which may show swell and shrink characteristics of from 1.0% to 1.75%. As pointed out, our new film is relatively noninflammable. Other advantages will be apparent to those skilled in the art.

What we claim is:

1. A cellulose acetate solution capable of being rapidly formed into a relatively noninflammable film base comprised essentially of cellulose acetate having an acetyl content between 42.5% and 44%, said cellulose acetate being dissolved in a solvent composed of methylene chloride 65 to 90%, methyl alcohol 25 to 5% and cyclohexane 5 to 10%.

2. A cellulose acetate film-forming solution capable of being rapidly formed into a relatively noninflammable nonbrittle film base, the solution consisting essentially of cellulose acetate having an acetyl content between 42.5% and 44%, this cellulose acetate being dissolved in a solvent essentially comprised of methylene chloride 65 to 90%, methyl alcohol 25 to 5% and cyclohexane greater than 4% and not greater than 10%.

3. A cellulose acetate film-forming solution capable of being rapidly formed into a relatively noninflammable nonbrittle film base, the solution consisting essentially of cellulose acetate having an acetyl content between 42.5% and 44%, this cellulose acetate being dissolved in a solvent essentially comprised of methylene chloride 65 to 90%, methyl alcohol 25 to 5% and cyclohexane between 8 and 10%.

4. As a composition of matter a cellulose acetate film-forming solution capable of being rapidly formed into a relatively noninflammable nonbrittle film base, said solution being composed of cellulose acetate having an acetyl content within the range of 42.5% to 44% dissolved in a solvent mixture consisting essentially of methylene chloride, and unsubstituted aliphatic monohydric alcohol of 1 to 2 carbon atoms and cyclohexane in amount greater than 4% but not greater than 10%.

5. As a composition of matter a cellulose acetate film-forming solution capable of being cast into a relatively noninflammable nonbrittle film base, this solution consisting essentially of cellulose acetate having an acetyl content between 42.5 and 44%, the cellulose acetate being dissolved in a solvent composed of methylene chloride and unsubstituted aliphatic monohydric alcohol of 1 to 2 carbon atoms and a content of cyclohexane between 5 and 10%, the solution also containing a content of plasticizer not greater in per cent than the combined percentage contents of the alcohol and cyclohexane in the solvent.

6. A relatively noninflammable, nonbrittle, dimensionally stable, finished acetate film capable of being readily spliced and characterized in that it is composed substantially entirely of plasticized cellulose acetate wherein the cellulose acetate has an acetyl content between 42.5% and 44%, and the finished film having properties of the following order:

|  | Length | Width |
| --- | --- | --- |
| Swell and shrink, percent not greater than about | 0.6 | 0.8 |
| Tensile strength, lbs./sq. in. not less than about | 12,900 | 11,250 |
| Folds not less than about | 12 | 12 |
| Tear, grams not less than about | 38 | 43 |

7. A relatively noninflammable, nonbrittle, dimensionally stable, finished acetate film capable of being readily spliced and characterized in that it is composed substantially entirely of plasticized cellulose acetate wherein the cellulose acetate has an acetyl content between 42.5% and 44%, and the finished film having properties of the following order:

| | Length | Width |
|---|---|---|
| Swell and shrink, percent not greater than about | 0.6 | 0.8 |
| Tensile strength, lbs./sq. in. not less than about | 12,900 | 11,250 |
| Folds not less than about | 12 | 12 |
| Tear, grams not less than about | 38 | 43 | said film having been deposited from a composition comprising essentially cellulose acetate having an acetyl content between 42.5% and 44% dissolved in a solvent composed of methylene chloride from about 65% to 90%, a methyl alcohol from about 25% to 5% and cyclohexane from about 8% to 10%.

CHARLES R. FORDYCE.
BRUCE E. GRAMKEE.

REFERENCES CITED

The following references are of record in the file of this patent:

UNITED STATES PATENTS

| Number | Name | Date |
|---|---|---|
| 1,384,188 | Goener | July 12, 1921 |
| 1,467,105 | Carroll | Sept. 4, 1923 |
| 2,367,503 | Hunter et al. | Jan. 16, 1945 |